United States Patent
Sakamoto et al.

(10) Patent No.: US 11,631,167 B2
(45) Date of Patent: Apr. 18, 2023

(54) GRAIN GLOSS MEASUREMENT APPARATUS

(71) Applicant: SATAKE CORPORATION, Tokyo (JP)

(72) Inventors: Hisashi Sakamoto, Tokyo (JP); Koshiro Kajiyama, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 260 days.

(21) Appl. No.: 17/057,139

(22) PCT Filed: Mar. 29, 2019

(86) PCT No.: PCT/JP2019/014342
§ 371 (c)(1),
(2) Date: Nov. 20, 2020

(87) PCT Pub. No.: WO2019/230182
PCT Pub. Date: Dec. 5, 2019

(65) Prior Publication Data
US 2021/0192713 A1  Jun. 24, 2021

(30) Foreign Application Priority Data

Jun. 1, 2018 (JP) .............................. JP2018-106109

(51) Int. Cl.
*G06T 7/00* (2017.01)
*G01N 21/57* (2006.01)
(Continued)

(52) U.S. Cl.
CPC ........... *G06T 7/0004* (2013.01); *G01N 21/57* (2013.01); *G06V 10/143* (2022.01); *G06V 10/56* (2022.01);
(Continued)

(58) Field of Classification Search
USPC .......... 382/110; 356/448; 209/580; 426/231; 702/81
See application file for complete search history.

(56) References Cited

U.S. PATENT DOCUMENTS 4,483,244 A  11/1984  Hosaka
6,166,393 A  12/2000  Paul et al.
(Continued)

FOREIGN PATENT DOCUMENTS

EP         1046902 A2 * 10/2000 ............. G01N 21/85
JP     S59-109249 A   6/1984
(Continued)

Primary Examiner — Kathleen Y Dulaney
(74) Attorney, Agent, or Firm — Faegre Drinker Biddle & Reath LLP

(57) ABSTRACT

Provided is a grain gloss measurement apparatus capable of accurately measuring gloss of grain. A grain gloss measurement apparatus includes a light source to emit light to a measurement region for grain in an oblique direction, a light receiver to receive the light reflected from the measurement region, and a gloss value calculation device to calculate a gloss value of the grain based on the reflected light received by the light receiver. The light source includes a first light source to emit light to the measurement region from one side and a second light source to emit light from another side that is opposite to the first light source across the measurement region. The light emitted from the first light source and the light emitted from the second light source have different wavelengths. The light receiver is disposed on the same side as the second light source, and the gloss value calculation device includes an image processing unit to identify a grain zone in the measurement region based on the light of the second light source that is reflected off the grain and received by the light receiver.

8 Claims, 5 Drawing Sheets

(51) Int. Cl.
G06V 10/56 (2022.01)
G06V 10/143 (2022.01)

(52) U.S. Cl.
CPC ............... *G06T 2207/10152* (2013.01); *G06T 2207/30128* (2013.01)

(56) References Cited

U.S. PATENT DOCUMENTS

| | | | | |
|---|---|---|---|---|
| 9,772,230 | B2* | 9/2017 | Ehbets | G01J 3/50 |
| 10,235,743 | B2* | 3/2019 | Uozumi | G06T 5/20 |
| 10,578,557 | B2* | 3/2020 | Ishizuki | G01N 21/8851 |
| 2006/0256341 | A1* | 11/2006 | Kuwada | G01N 21/57 |
| | | | | 356/445 |
| 2008/0245979 | A1 | 10/2008 | Banton et al. | |
| 2009/0009766 | A1* | 1/2009 | Bonino | G01J 3/027 |
| | | | | 356/402 |
| 2012/0171338 | A1* | 7/2012 | Hamid | G01N 21/85 |
| | | | | 356/402 |
| 2013/0057868 | A1* | 3/2013 | Oba | G01N 21/4738 |
| | | | | 356/445 |
| 2014/0129179 | A1* | 5/2014 | Xu | G01N 21/57 |
| | | | | 356/448 |
| 2016/0040985 | A1 | 2/2016 | Nagai et al. | |
| 2016/0320311 | A1* | 11/2016 | Mishra | G01N 33/10 |
| 2017/0308002 | A1* | 10/2017 | Isoda | G03G 15/0855 |
| 2017/0350825 | A1* | 12/2017 | Ishizuki | B07C 5/3425 |
| 2018/0222686 | A1* | 11/2018 | Kohlbrenner | H04N 5/2256 |
| 2018/0357793 | A1* | 12/2018 | Boes | G01J 3/0291 |
| 2020/0064194 | A1* | 2/2020 | Dauga | G01J 3/501 |
| 2020/0113441 | A1* | 4/2020 | Varghese | A61B 5/7278 |
| 2020/0323482 | A1* | 10/2020 | Ras | G02B 15/02 |

FOREIGN PATENT DOCUMENTS

| | | |
|---|---|---|
| JP | 2001-174412 A | 6/2001 |
| JP | 2001-514386 A | 9/2001 |
| JP | 2008-256691 A | 10/2008 |
| JP | 2012-525575 A | 10/2012 |
| JP | 2013-53932 A | 3/2013 |
| JP | 2016-38222 A | 3/2016 |

* cited by examiner

GRAIN GLOSS MEASUREMENT APPARATUS

CROSS REFERENCE TO PRIOR APPLICATIONS

This application is the National Stage of International Application No. PCT/JP2019/014342 filed Mar. 29, 2019 and claims benefit of Japanese Application No. 2018-106109 filed Jun. 1, 2018, which are herein incorporated by reference in their entirety.

TECHNICAL FIELD

The present invention relates to a grain gloss measurement apparatus that measures gloss of the surface of grains such as polished rice and beans.

BACKGROUND ART

One of items listed to evaluate quality of a rice grain is gloss. Conventionally, gloss of surfaces of rice grains has been evaluated visually by testers. However, the visual evaluation is influenced by senses of humans and lacks objectivity. As a result, the visual evaluation has a disadvantage of failing to quantitatively evaluate gloss of surfaces of rice grains.

To overcome the disadvantage, an apparatus for optically measuring gloss of rice grains is presented (refer to Patent Literature 1).

The gloss measurement apparatus described in Patent Literature 1 includes a channel (3) to supply grain, a light emitting device (13) to emit light to a surface of the grain, and a light sensing device (11) to sense the light reflected off the surface of the grain and capture an image of the grain. The gloss measurement apparatus described in Patent Literature 1 further includes a processing unit to generate a histogram showing the number of pixels in an image at each different intensity values found in that image, to calculate a deviation from the histogram, and to determine the degree of gloss of the grain based on the calculated deviation.

The gloss measurement apparatus described in Patent Literature 1 can quantitatively evaluate gloss of the surface of rice grains by converting the gloss of the rice grains into a numerical form.

Unfortunately, in the gloss measurement apparatus described in Patent Literature 1, the light sensing device (11) senses light reflected from the rice grains and light reflected from the supply channel simultaneously. Thus, the gloss measurement apparatus described in Patent Literature 1 cannot distinguish between light reflected from the rice grains and light reflected from the supply channel. As a result, the gloss measurement apparatus described in Patent Literature 1 cannot accurately measure gloss of rice grains.

CITATION LIST

Patent Literature

[Patent Literature 1] U.S. Patent Application Publication No. 2016/0320311

SUMMARY OF INVENTION

Technical Problem

It is an object of the present invention to provide a grain gloss measurement apparatus capable of accurately measuring gloss of grain.

Solution to Problem

A grain gloss measurement apparatus according to the present invention, accomplished to attain the object described above, includes:
a light source to emit light to a measurement region for grain in an oblique direction;
a light receiver to receive the light reflected from the measurement region; and
a gloss value calculation device to calculate a gloss value of the grain based on the reflected light received by the light receiver,
wherein the light source includes:
a first light source to emit light to the measurement region from one side; and
a second light source to emit light from another side that is opposite to the first light source across the measurement region, the light emitted from the first light source and the light emitted from the second light source having different wavelengths,
wherein the light receiver is disposed on the same side as the second light source, and
wherein the gloss value calculation device includes an image processing unit to identify a grain zone in the measurement region based on the light of the second light source that is reflected off the grain and received by the light receiver.

Preferably, according to the present invention, the gloss value calculation device includes an image processing unit to identify a gloss zone in the measurement region based on the light of the first light source that is reflected off and received by the light receiver, identify a grain zone in the measurement region based on the light of the second light source that is reflected off the grain and received by the light receiver, and identify a grain gloss zone based on the gloss zone and the grain zone.

Preferably, according to the present invention, the image processing unit produces a first binary image to identify the gloss zone in the measurement region as a white zone based on an amount of the light of the first light source that is reflected off and received by the light receiver, produces a second binary image to identify the grain zone in the measurement region as a white zone based on an amount of the light of the second light source that is reflected off the grain and received by the light receiver, and identifies the grain gloss zone based on the first binary image and the second binary image.

Preferably, according to the present invention, the gloss value calculation device includes a gloss value calculator to determine an area of the grain zone (S1) and an area of the grain gloss zone (S2) and calculate the gloss value of the grain based on a ratio of the area of the grain gloss zone to the area of the grain zone (S2/S1).

Preferably, according to the present invention, the gloss value calculation device includes a gloss value calculator to calculate the gloss value of the grain based on both an amount of the light of the first light source that is reflected off the grain gloss zone and received by the light receiver and the amount of the light of the first light source that is reflected off a reference plate and received by the light receiver, the reference plate being disposed on the measurement region and having a specified glossiness.

Preferably, according to the present invention, the gloss value calculator determines an integrated value (A2) of the amount of the light of the first light source that is reflected off the grain gloss zone and received by the light receiver, converts the integrated value (A2) into an integrated value (A2×S0/S1) of an amount of the reflected light that is equivalent to the amount calculated on condition that polished rice (an area (S1)) is present all over an area of the reference plate (S0), and calculates the gloss value of the grain based on a comparison between the converted integrated value and an integrated value (A0) of the amount of the light of the first light source that is reflected off the reference plate and received by the light receiver.

Preferably, according to the present invention, the gloss value calculation device includes a gloss value calculator to determine an integrated value (A2) of the amount of the light of the first light source that is reflected off the grain gloss zone and received by the light receiver, convert the integrated value into an integrated value (A2×S0/S1) of an amount of the reflected light that is equivalent to the amount calculated on condition that polished rice (an area (S1)) is present all over an area of a reference plate (S0) being disposed on the measurement region and having a specified glossiness, and calculate the gloss value of the grain based on a comparison between the converted integrated value and an integrated value (A0) of the amount of the light of the first light source that is reflected off the reference plate and received by the light receiver.

Preferably, according to the present invention, the measurement region has a measurement surface that is flat and that the grain is placed on, the first light source is disposed on the one side of and above the measurement surface so as to be tilted at an angle of 60 degrees to 75 degrees from a direction perpendicular to the measurement surface, the second light source is disposed on the other side of and above the measurement surface so as to be tilted at an angle of 30 degrees to 60 degrees from the direction perpendicular to the measurement surface, and the light receiver is on the same side as the second light source, the light receiver being disposed on the other side of and above the measurement surface so as to be tilted at an angle of 60 degrees to 75 degrees from the direction perpendicular to the measurement surface.

Preferably, according to the present invention, the measurement surface is a predetermined zone on a flat conveyance surface in a conveyance direction of a conveyor.

Preferably, according to the present invention, the second light source is a blue-light source.

Advantageous Effects of Invention

In a grain gloss measurement apparatus of the present invention, a light source includes a first light source to emit light to a measurement region from one side and a second light source to emit light from the other side that is opposite to the first light source across the measurement region. The light emitted from the first light source and the light emitted from the second light source have different wavelengths. In the grain gloss measurement apparatus, a light receiver is disposed on the same side as the second light source, and a gloss value calculation device includes an image processing unit to identify a grain zone in the measurement region based on the light of the second light source that is reflected off the grain and received by the light receiver. As a result, the grain gloss measurement apparatus identifies the grain zone in the measurement region and is thus able to distinguish between the light reflected off the grain and the light reflected off the measurement region in the light of the first light source that is reflected off and received by the light receiver.

Consequently, the grain gloss measurement apparatus of the present invention is capable of accurately measuring gloss of grain.

In the grain gloss measurement apparatus of the present invention, the gloss value calculation device may include an image processing unit to identify a gloss zone in the measurement region based on the light of the first light source that is reflected off and received by the light receiver, identify a grain zone in the measurement region based on the light of the second light source that is reflected off the grain and received by the light receiver, and identify a grain gloss zone based on the gloss zone and the grain zone. This configuration enables the grain gloss measurement apparatus to identify the grain gloss zone in the measurement region and thus accurately measure gloss of the grain.

In the grain gloss measurement apparatus of the present invention, the gloss value calculation device may include a gloss value calculator to determine an area of the grain zone (S1) and an area of the grain gloss zone (S2) and calculate the gloss value of the grain based on a ratio of the area of the grain gloss zone to the area of the grain zone (S2/S1). This configuration enables the grain gloss measurement apparatus to convert the gloss of the grain into a numerical form without influence of the number of grains present in the measurement region.

In the grain gloss measurement apparatus of the present invention, the gloss value calculation device may include a gloss value calculator to calculate the gloss value of the grain based on both an amount of the light of the first light source that is reflected off the grain gloss zone and received by the light receiver and the amount of the light of the first light source that is reflected off a reference plate and received by the light receiver, the reference plate being disposed on the measurement region and having a specified glossiness. This configuration enables the grain gloss measurement apparatus to convert the gloss of the grain into a numerical form in conformance with the Japanese Industrial Standards (JIS) or the International Standards Organization (ISO) standards.

In the grain gloss measurement apparatus of the present invention, the gloss value calculator may determine an integrated value (A2) of the amount of the light of the first light source that is reflected off the grain gloss zone and received by the light receiver, convert the integrated value (A2) into an integrated value (A2×S0/S1) of an amount of the reflected light that is equivalent to the amount calculated on condition that polished rice (an area (S1)) is present all over an area of the reference plate (S0), and calculate the gloss value of the grain based on a comparison between the converted integrated value and an integrated value (A0) of the amount of the light of the first light source that is reflected off the reference plate and received by the light receiver. This enables the grain gloss measurement apparatus to convert the gloss of the grain into a numerical form in consideration of a degree of the gloss.

In the grain gloss measurement apparatus of the present invention, the measurement region may have a measurement surface that is flat and that the grain is placed on, the first light source may be disposed on the one side of and above the measurement surface so as to be tilted at an angle of 60 degrees to 75 degrees from a direction perpendicular to the measurement surface, the second light source may be disposed on the other side of and above the measurement surface so as to be tilted at an angle of 30 degrees to 60 degrees from the direction perpendicular to the measurement surface, and the light receiver may be on the same side as the second light source, the light receiver being disposed on the other side of and above the measurement surface so as to be tilted at an angle of 60 degrees to 75 degrees from the direction perpendicular to the measurement surface. This configuration enables the grain gloss measurement apparatus to accurately measure the gloss of the grain placed on the measurement surface.

In the grain gloss measurement apparatus of the present invention, the measurement surface may be a predetermined zone on a flat conveyance surface in a conveyance direction of a conveyor. This configuration enables the grain gloss measurement apparatus to measure the gloss of the grain in conveyance a plurality of times successively and determine an average of values of the gloss of the grain. This eliminates influence of position of the grain and individual differences.

In the grain gloss measurement apparatus of the present invention, the second light source may be a blue-light source. This configuration, if the grain is polished rice, enables the grain gloss measurement apparatus to measure a degree of whiteness (whiteness) of the polished rice simultaneously. Thus, if the amount of the light of the first light source that is reflected off the polished rice and received by the light receiver is likely to vary with the degree of whiteness of the polished rice, the grain gloss measurement apparatus can correct the gloss value of the polished rice.

DESCRIPTION OF EMBODIMENTS

An embodiment of the present invention will be described with reference to the drawings.

Figure 1:
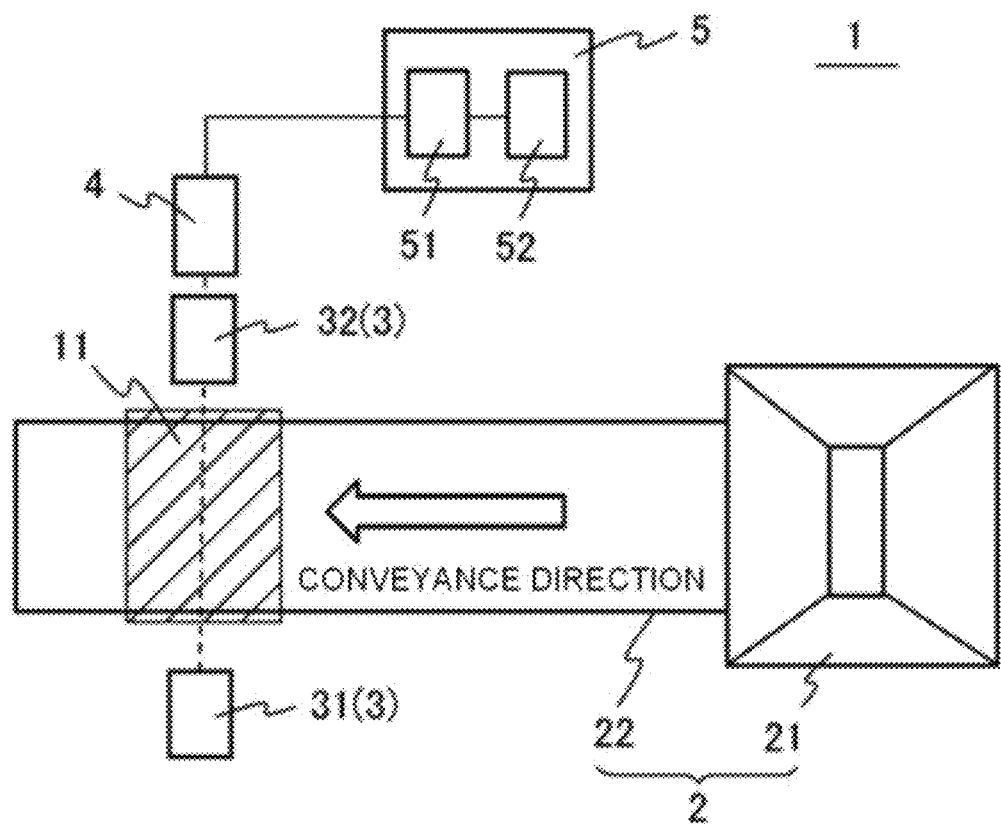
FIG. 1 is a schematic plan view of a grain gloss measurement apparatus according to an embodiment of the present invention.
Figure 2:
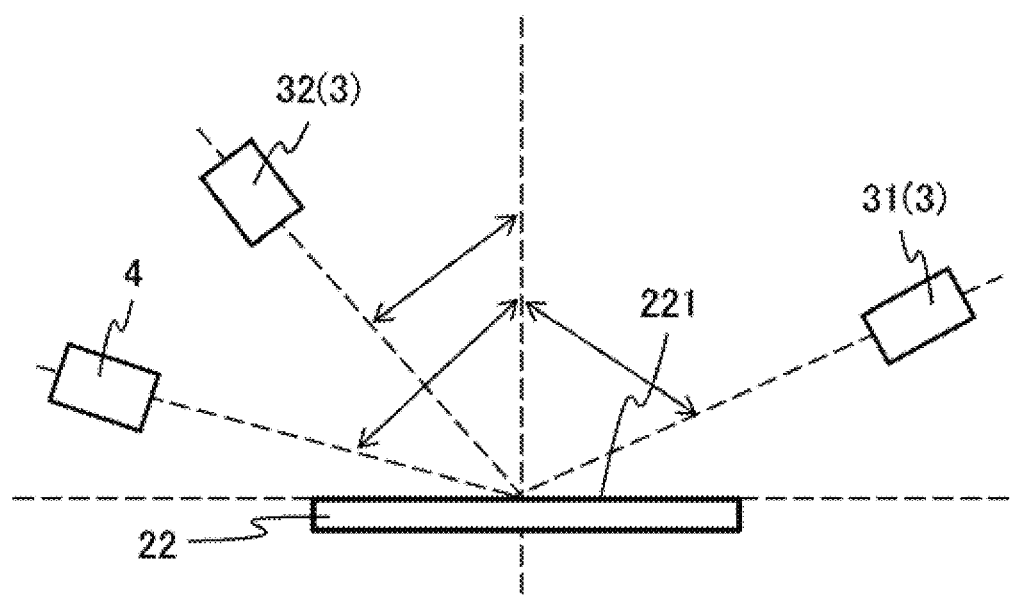
FIG. 2 is a schematic view illustrating a measurement region in the apparatus of FIG. 1, viewed from a downstream side of a conveyor.

FIG. 1 is a schematic plan view of a grain gloss measurement apparatus according to an embodiment of the present invention. FIG. 2 is a schematic view illustrating a measurement region in a grain gloss measurement apparatus according to an embodiment of the present invention, viewed from a downstream side of a conveyor.

A grain gloss measurement apparatus 1 according to an embodiment of the present invention includes a conveyor 2 to convey grain to a measurement region 11, a light source 3 to emit light to the measurement region 11 in an oblique direction, a light receiver 4 to receive the light reflected from the measurement region 11, and a gloss value calculation device 5 to calculate a gloss value of the grain based on the reflected light received by the light receiver 4.

The conveyor 2 includes a hopper 21 to supply grain and a vibratory feeder 22 to convey the grain supplied from the hopper 21 to the measurement region 11 with the grain placed on the vibratory feeder. The vibratory feeder 22 has a flat conveyance surface. A predetermined zone on the conveyance surface in a conveyance direction is a measurement surface 221 of the measurement region 11.

The light source 3 includes a first light source 31 to emit light to the measurement region 11 from one side orthogonal to the conveyance direction for grain and a second light source 32 to emit light from the other side that is opposite to the first light source 31 across the measurement region 11. The light emitted from the first light source 31 and the light emitted from the second light source 32 have different wavelengths.

The first light source 31 is disposed on the one side of and diagonally above the measurement surface 221 and is tilted at an angle of 60 degrees to 75 degrees, preferably 60 degrees, from a direction perpendicular to the measurement surface. The second light source 32 is disposed on the other side of and diagonally above the measurement surface 221 and is tilted at an angle of 30 degrees to 60 degrees, preferably 30 degrees, from the direction perpendicular to the measurement surface.

In this example, the first light source 31 is a red light-emitting diode (LED), and the second light source 32 is a blue light-emitting diode (LED).

The light receiver 4 is a camera with a built-in imaging device that uses charge-coupled device (CCD), complementary metal-oxide semiconductor (CMOS), or other technology.

The camera 4, which is on the same side as the blue LED 32, is disposed on the other side of and diagonally above the measurement surface 221 and is tilted at an angle of 60 degrees to 75 degrees, preferably 75 degrees, from the direction perpendicular to the measurement surface.

The camera 4 captures an image of the measurement region 11 that is illuminated with a red light from the red LED 31 and a blue light from the blue LED 32 to acquire data on the captured image. In this way, the camera 4 receives the red light reflected from the measurement region 11 and receives the blue light reflected from the measurement region 11.

The gloss value calculation device 5 is a computer. The gloss value calculation device 5 includes an image processing unit 51 to produce a binary image and identify a grain zone and a grain gloss zone based on the reflected light that the camera 4 receives from the measurement region 11. The gloss value calculation device 5 also includes a gloss value calculator 52 to extract information about a gloss value of the grain and calculate the gloss value of the grain.

Figure 3:
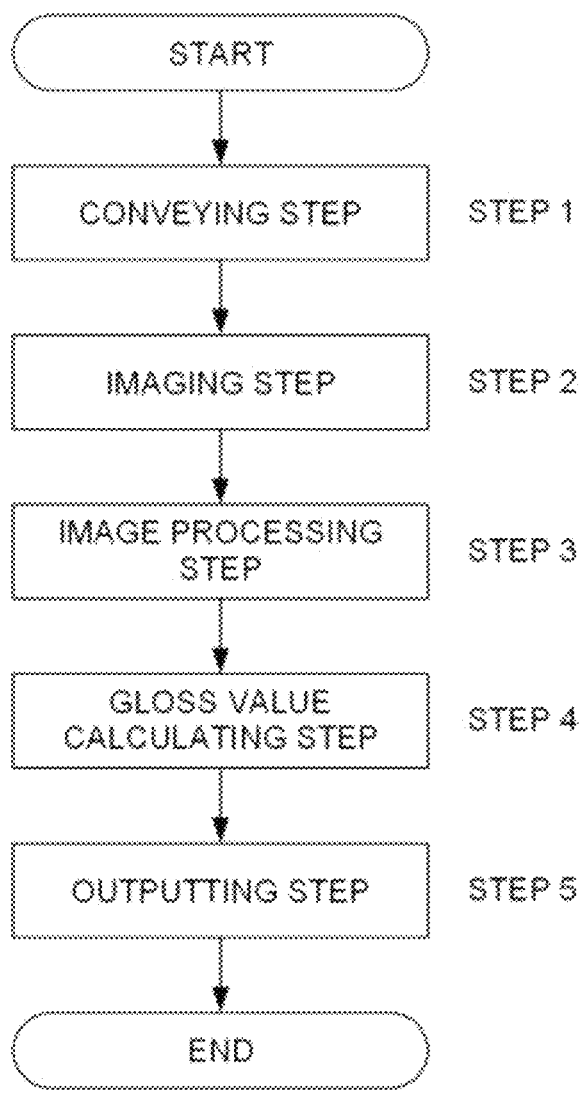
FIG. 3 is a flowchart illustrating measurement of gloss of grain using the apparatus of FIG. 1.

FIG. 3 is a flowchart illustrating measurement of gloss of grain using the grain gloss measurement apparatus according to the embodiment of the present invention.

In the embodiment of the present invention, the gloss measurement apparatus 1 measures gloss of grain through steps shown below. In this instance, the apparatus measures gloss of polished rice, an example of the grain.

(1) Conveying Step (Step 1)

Polished rice that is supplied from the hopper 21 and placed on the conveyance surface of the vibratory feeder 22 is conveyed in a thin layer form to the measurement region 11.

(2) Imaging Step (Step 2)

With the red LED 31 emitting a red light to the measurement region 11 from the one side orthogonal to the conveyance direction for polished rice and the blue LED 32 emitting a blue light to measurement region 11 from the other side, the camera 4 captures an image of the polished rice on the measurement surface 221.

Since the camera 4 is disposed on the side opposite the red LED 31, the camera 4 receives the red light reflected off a surface of the measurement surface 221 on which the polished rice is not present, as well as the red light reflected off a surface of the polished rice simultaneously.

The camera 4 is disposed on the same side as the blue LED 32. Thus, the camera 4 receives the blue light reflected off the surface of the polished rice but does not receive the blue light reflected off the surface of the measurement surface 221 on which the polished rice is not present because the reflection of the blue light from the measurement surface 221 is specular reflection.

(3) Image Processing Step (Step 3)

The image processing unit 51 processes data on the image captured by the camera 4 to identify a zone of the polished rice and a zone of a gloss portion of the polished rice on the measurement surface 221.

(4) Gloss Value Calculating Step (Step 4)

The gloss value calculator 52 extracts information about a gloss value of the polished rice based on the image data processed by the image processing unit 51 and data on the image captured by the camera 4 to calculate the gloss value of the polished rice.

(5) Outputting Step (Step 5)

The gloss value of the polished rice calculated by the gloss value calculator 52 is output in numerical form to a monitor such as a display.

Figure 4:
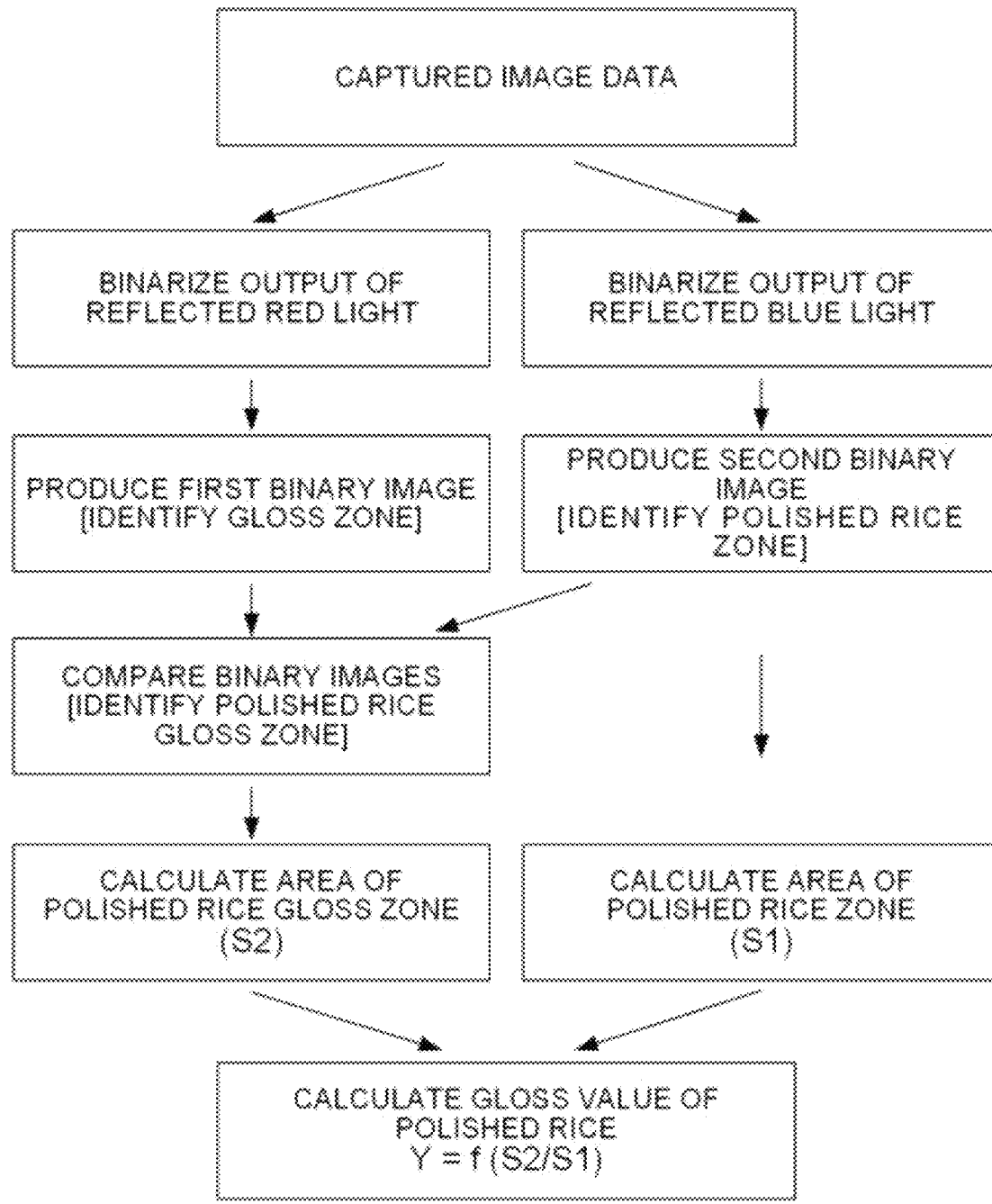
FIG. 4 is a flowchart illustrating calculation of a gloss value of grain.

FIG. 4 is an example of a flowchart illustrating calculation of a gloss value of grain.

In the image processing step (step 3), the image processing unit 51 binarizes an output signal of the reflected red light received by the camera 4 and produces a first binary image to identify a gloss zone on the measurement surface 221 as a white zone in units of pixels.

The image processing unit 51 binarizes an output signal of the reflected blue light received by the camera 4 and produces a second binary image to identify a polished rice zone on the measurement surface 221 as a white zone in units of pixels.

The image processing unit 51 compares the first binary image and the second binary image to identify a polished rice gloss zone in units of pixels.

Next, in the gloss value calculating step (step 4), the gloss value calculator 52 calculates an area of the polished rice zone (S1) from the second binary image.

The gloss value calculator 52 calculates an area of the polished rice gloss zone (S2) from a result of the comparison between the first binary image and the second binary image.

The gloss value calculator 52 calculates the gloss value of the polished rice based on a ratio of the area of the polished rice gloss zone to the area of the polished rice zone (S2/S1).

The area of the polished rice zone (S1) is determined by counting a number of pixels in the white zone on the second binary image. The area of the polished rice gloss zone (S2) is determined by counting a number of pixels in a zone identified based on the result of the comparison between the first binary image and the second binary image.

According to the flowchart shown in FIG. 4 for calculation of the gloss value of grain, the gloss value of the polished rice is calculated based on the ratio of the area of the polished rice gloss zone to the area of the polished rice zone (S2/S1). Thus, the gloss of the polished rice is converted into a numerical form without influence of the number of the polished rice present on the measurement surface 221.

In the embodiment of the present invention, the second light source 32 is a blue-light source. Hence, a degree of whiteness (whiteness) of the polished rice is measured simultaneously with the gloss value of the polished rice.

An amount of the light of the first light source 31 that is reflected off the polished rice and received by the camera 4 is likely to vary with the degree of whiteness of the polished rice. Nevertheless, even in this case, the degree of whiteness of the polished rice is measured and thus the gloss value of the polished rice is corrected.

Figure 5:
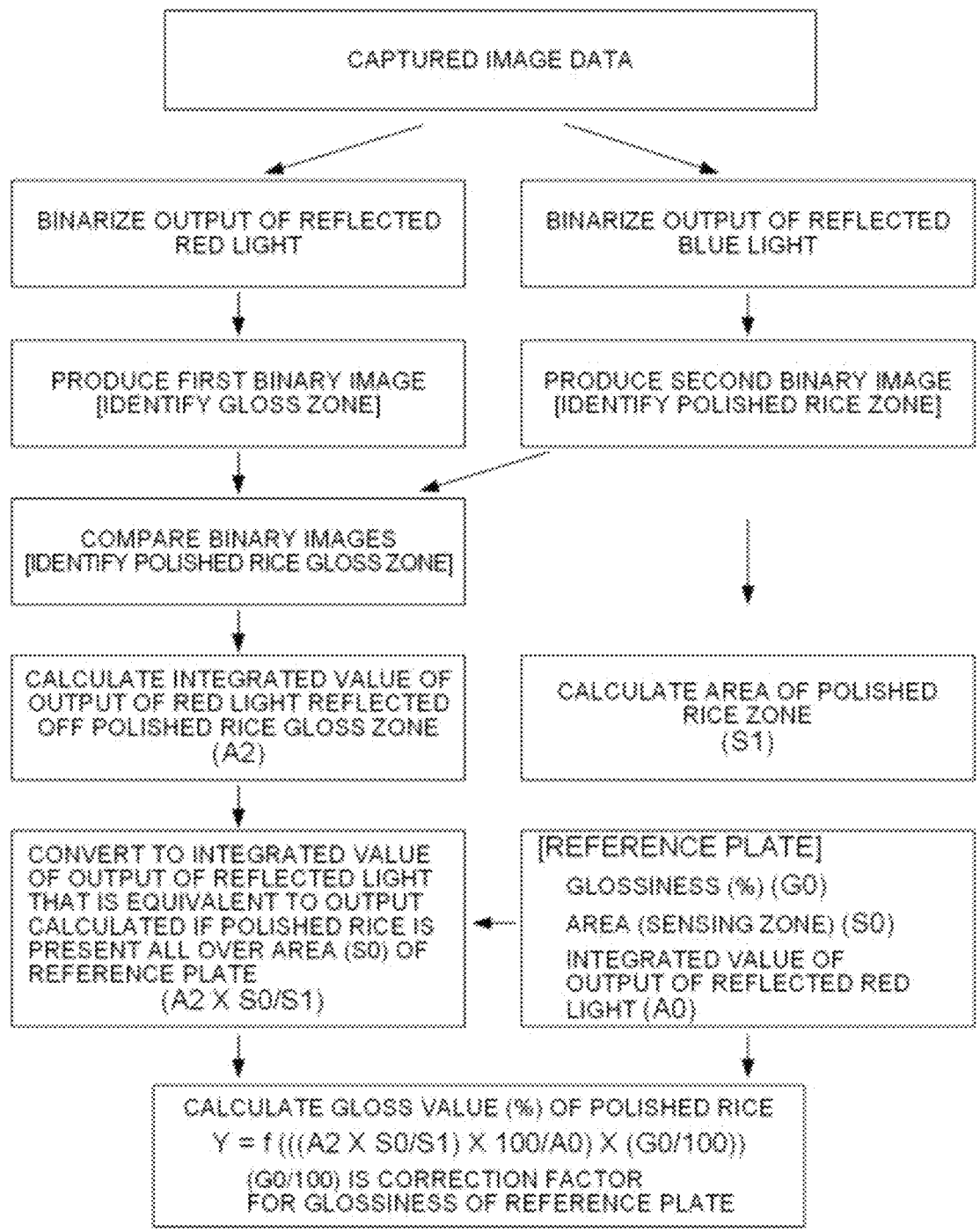
FIG. 5 is a flowchart illustrating calculation of a gloss value of grain.

FIG. 5 is another example of a flowchart illustrating calculation of a gloss value of grain. The calculation flowchart of FIG. 5 differs in process of gloss value calculation in the gloss value calculating step (step 4) from the calculation flowchart of FIG. 4. In the calculation flowchart of FIG. 5, the gloss value of polished rice is calculated on a percentage basis in accordance with the Japanese Industrial Standards (JIS) definition of glossiness shown in Expression 1.

Definition of glossiness (JIS Z 8741)

$$G = \phi \times 100/\phi os \quad \text{[Expression 1]}$$

G: glossiness $\phi os$: The amount of light reflected off glass surface with a refractive index of 1.567

$\phi s$: The amount of light reflected off measured object

In the gloss value calculating step (step 4), the gloss value calculator 52 calculates the gloss value of the polished rice based on both the amount of the red light that is reflected off the polished rice gloss zone identified by the image processing unit 51 and that is received by the camera 4 and the amount of the red light that is reflected off a reference plate having a specified glossiness (G0) and that is received by the camera 4.

Specifically, the gloss value calculator 52 determines an integrated value (A2) of the amount of the red light (an intensity of an output signal of the reflected light) that is reflected off the polished rice gloss zone and received by the camera 4. The gloss value calculator 52 converts the integrated value (A2) into an integrated value (A2×S0/S1) of an amount of the reflected light that is equivalent to the amount calculated on condition that the polished rice (the area (S1)) is present all over an area (a sensing zone) of the reference plate (S0). The gloss value calculator 52 calculates the gloss value of the polished rice based on a comparison between the converted integrated value and an integrated value (A0) of the amount of the red light that is reflected off the reference plate and received by the camera 4.

As shown in FIG. 5, by multiplying the gloss value of the polished rice by a ratio (G0/100) of the reference plate glossiness (G0) to the standard value of specular glossiness prescribed by the JIS, the gloss value of the polished rice is corrected to a gloss value in conformance with the JIS standards.

The amount of the red light that is reflected off the reference plate and received by the camera 4 is measured in advance prior to measurement of the gloss of polished rice. The amount of the red light that is reflected off the reference plate and received by the camera 4 is measured simultaneously with measurement of the gloss of polished rice, since the reference plate is disposed at a predetermined place on the measurement region 11.

The area of the reference plate (the sensing zone of the reference plate where light is reflected off and is sent to the camera 4) (S0) may be measured in advance.

According to the flowchart shown in FIG. 5 for calculation of the gloss value of grain, the gloss of the polished rice is converted into a numerical form in conformance with the JIS or other provisions.

According to the flowchart shown in FIG. 5 for calculation of the gloss value of grain, the gloss of the polished rice is converted into a numerical form in consideration of a degree of the gloss because the integrated value (A1) of the amount of the reflected red light is used in the calculation.

In an instance of the grain gloss value calculation flowchart shown in FIG. 5 as well, the second light source 32 is a blue-light source. Hence, the degree of whiteness (whiteness) of the polished rice is measured simultaneously.

Thus, even if the amount of the light of the first light source 21 that is reflected off the polished rice and received by the camera 4 varies with the degree of whiteness of the polished rice, the degree of whiteness of the polished rice is measured and thus the gloss value of the polished rice is corrected.

In the grain gloss measurement apparatus according to the embodiment of the present invention, the light source 3 includes the first light source 31 to emit light to the measurement region 11 from the one side and the second light source 32 to emit light from the other side that is opposite to the first light source 31 across the measurement region 11. The light emitted from the first light source 31 and the light emitted from the second light source 32 have different wavelengths. The camera 4 is disposed on the same side as the second light source 32. The gloss value calculation device 5 includes the image processing unit 51 to identify a grain zone in the measurement region 11 based on the light of the second light source 32 that is reflected off the grain and received by the camera 4. As a result, the grain zone is identified in the measurement region 11, and the light reflected off the grain and the light reflected off the measurement region 11 are distinguished in the light of the first light source 31 that is reflected off and received by the camera 4.

In the grain gloss measurement apparatus according to the embodiment of the present invention, the gloss value calculation device 5 includes the image processing unit 51 to identify a gloss zone in the measurement region 11 based on the light of the first light source 31 that is reflected off and received by the camera 4, identify a grain zone in the measurement region 11 based on the light of the second light source 32 that is reflected off the grain and received by the camera 4, and identify a grain gloss zone based on the gloss zone and the grain zone. This enables the grain gloss measurement apparatus to identify the grain gloss zone in the measurement region 11 and accurately measure gloss of the grain.

In the grain gloss measurement apparatus according to the embodiment of the present invention, the measurement surface 221 of the measurement region 11 is defined as a predetermined zone on the flat conveyance surface in the conveyance direction of the vibratory feeder 22. Thus, the gloss of the grain in conveyance is measured a plurality of times successively. By determining an average of values of the gloss, influence of position of the grain and individual differences is eliminated.

In the embodiment of the present invention described above, the conveyor 2 may include a turntable instead of the vibratory feeder 22.

In the embodiment of the present invention described above, a part of the flat conveyance surface of the vibratory feeder 22 (the measurement surface 221) constitutes the measurement region 11 for grain. However, if the grain flows down inside a transparent tube body, for example, a predetermined zone of the tube body may be a measurement region.

In the embodiment of the present invention described above, the gloss of the grain during conveyance over the conveyance surface of the conveyor 2 is measured. However, the gloss of grain placed at rest over a measurement surface may be measured.

In the embodiment of the present invention described above, the first light source 31 is a red-light source, and the second light source 32 is a blue-light source. The light sources, however, may be light sources of other colors having different wavelengths. Alternatively, a white light source and a filter may be combined to allow the first light source 31 and the second light source 32 to emit beams of light having respective different wavelengths.

In the embodiment of the present invention described above, the light sources are light-emitting diodes (LEDs). However, the light sources may be other lighting devices such as fluorescent lights.

In the grain gloss measurement apparatus according to the embodiment of the present invention, the gloss value calculation device 5 may be able to calculate the gloss value of the grain through another flowchart for calculation of the gloss value of the grain.

In the embodiment of the present invention, even when the gloss value of the grain is calculated, for example, through a grain gloss calculation flowchart described in the specification of U.S. Patent Application Publication No. 2016/0320311, the image processing unit 51 can identify a grain zone to distinguish between light reflected off the grain and light reflected off the measurement region. This enables the grain gloss measurement apparatus to accurately measure gloss of the grain.

The embodiment of the present invention has been described above. It is understood that the scope of the present invention should not be limited to the above embodiment and should include modifications as appropriate without departing from the spirit of the present invention.

INDUSTRIAL APPLICABILITY

The grain gloss measurement apparatus of the present invention identifies a grain zone and a grain gloss zone and is thereby able to accurately measure gloss of grain. The gloss measurement apparatus converts the gloss of the grain into a numerical form and is thereby able to quantitatively evaluate the gloss of the grain. Consequently, the grain gloss measurement apparatus of the present invention is very useful.

REFERENCE SIGNS LIST 1 gloss measurement apparatus
2 conveyor
21 hopper
22 vibratory feeder
221 measurement surface
3 light source
31 first light source (red LED)
32 second light source (blue LED)
4 light receiver (camera)
5 gloss value calculation device (computer)
51 image processing unit
52 gloss value calculator

The invention claimed is:

1. A grain gloss measurement apparatus comprising:
a light source configured to emit light to a measurement region for grain in an oblique direction;
a light receiver configured to receive the light reflected from the measurement region; and
a gloss value calculation device configured to calculate a gloss value of the grain based on the reflected light received by the light receiver,
wherein the light source comprises:

a first light source configured to emit light to the measurement region from one side; and a second light source configured to emit light from another side that is opposite to the first light source across the measurement region, the light emitted from the first light source and the light emitted from the second light source having different wavelengths, wherein the light receiver is disposed on a same side as the second light source, and wherein the gloss value calculation device comprises an image processing unit configured to: i) identify a gloss zone in the measurement region based on the light of the first light source that is reflected off and received by the light receiver, ii) identify a grain zone in the measurement region based on the light of the second light source that is reflected off the grain and received by the light receiver, and iii) identify a grain gloss zone based on the gloss zone and the grain zone.

2. The grain gloss measurement apparatus according to claim 1, wherein the image processing unit is configured to:

produce a first binary image to identify the gloss zone in the measurement region as a white zone based on an amount of the light of the first light source that is reflected off and received by the light receiver, produce a second binary image to identify the grain zone in the measurement region as a white zone based on an amount of the light of the second light source that is reflected off the grain and received by the light receiver, and identify the grain gloss zone based on the first binary image and the second binary image.

3. The grain gloss measurement apparatus according to claim 1, wherein the gloss value calculation device comprises a gloss value calculator configured to determine an area of the grain zone and an area of the grain gloss zone and calculate the gloss value of the grain based on a ratio of the area of the grain gloss zone to the area of the grain zone.

4. The grain gloss measurement apparatus according to claim 1, wherein the gloss value calculation device comprises a gloss value calculator configured to calculate the gloss value of the grain based on both an amount of the light of the first light source that is reflected off the grain gloss zone and received by the light receiver and the amount of the light of the first light source that is reflected off a reference plate and received by the light receiver, the reference plate being disposed on the measurement region and having a specified glossiness.

5. The grain gloss measurement apparatus according to claim 4, wherein the gloss value calculator is configured to determine an integrated value of the amount of the light of the first light source that is reflected off the grain gloss zone and received by the light receiver, convert the integrated value into an integrated value of an amount of the reflected light received by the light receiver that is equivalent to an amount calculated on condition that polished rice is present all over an area of the reference plate, and calculate the gloss value of the grain based on a comparison between the converted integrated value and an integrated value of the amount of the light of the first light source that is reflected off the reference plate and received by the light receiver.

6. The grain gloss measurement apparatus according to claim 1, wherein the measurement region has a measurement surface that is flat and that the grain is placed on, wherein the first light source is disposed on the one side of and above the measurement surface so as to be tilted at an angle of 60 degrees to 75 degrees from a direction perpendicular to the measurement surface, wherein the second light source is disposed on another side of and above the measurement surface so as to be tilted at an angle of 30 degrees to 60 degrees from the direction perpendicular to the measurement surface, and wherein the light receiver is on the same side as the second light source, the light receiver being disposed on the another side of and above the measurement surface so as to be tilted at an angle of 60 degrees to 75 degrees from the direction perpendicular to the measurement surface.

7. The grain gloss measurement apparatus according to claim 6, wherein the measurement surface is a predetermined zone on a flat conveyance surface in a conveyance direction of a conveyor.

8. The grain gloss measurement apparatus according to claim 1, wherein the second light source is a blue-light source.

* * * * *